C. S. LOCKWOOD.
SPRING LOCK FOR ADJUSTABLE CASINGS OF ROLLER BEARINGS.
APPLICATION FILED JUNE 27, 1910.
1,018,121. Patented Feb. 20, 1912.
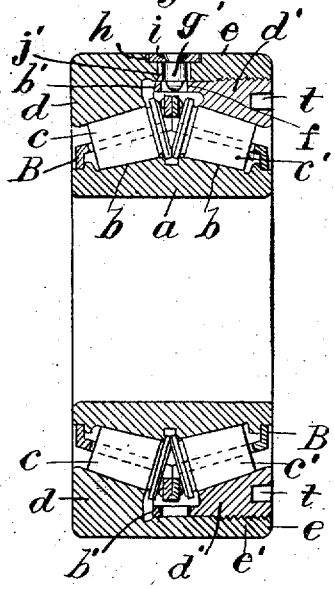
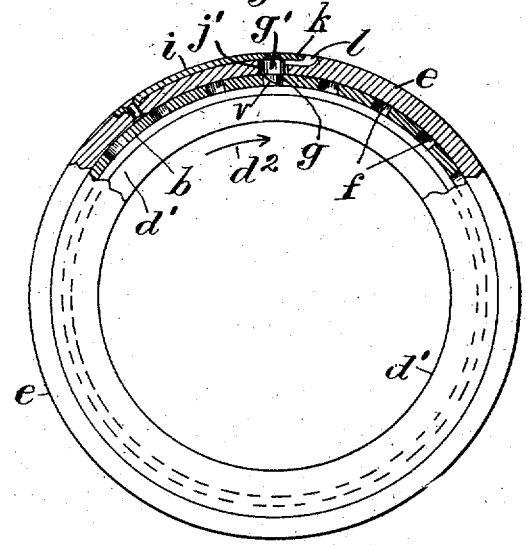
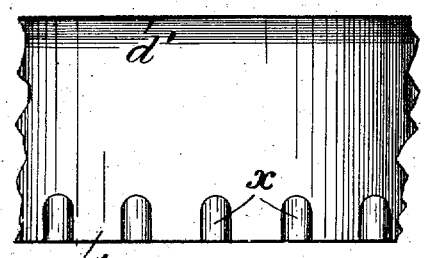
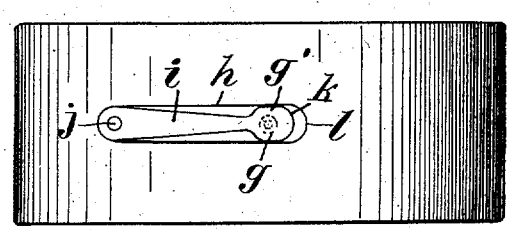
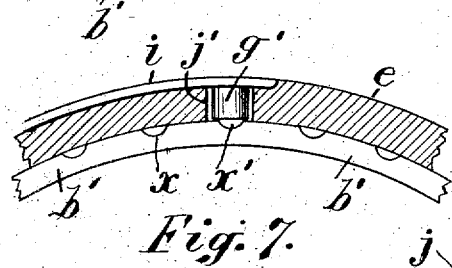
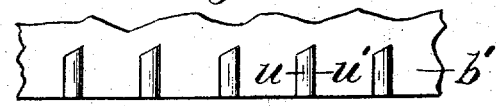
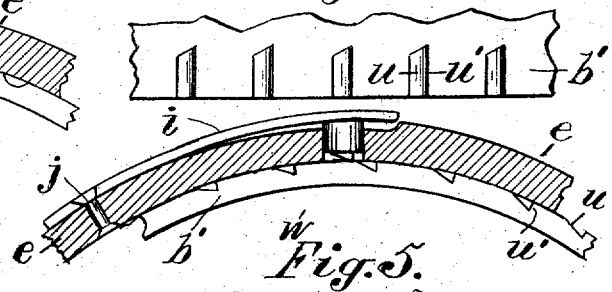
Witnesses
L. Lee.
J. Walter Greenbaum.
Inventor
Charles S. Lockwood, per
Thomas S. Crane, Atty.

UNITED STATES PATENT OFFICE.

CHARLES S. LOCKWOOD, OF NEWARK, NEW JERSEY, ASSIGNOR TO HYATT ROLLER BEARING COMPANY, OF HARRISON, NEW JERSEY, A CORPORATION OF NEW JERSEY.

SPRING-LOCK FOR ADJUSTABLE CASINGS OF ROLLER-BEARINGS.

1,018,121.  Specification of Letters Patent.  Patented Feb. 20, 1912.

Application filed June 27, 1910. Serial No. 568,969.

*To all whom it may concern:*

Be it known that I, CHARLES S. LOCKWOOD, a citizen of the United States, residing at 289 Market street, Newark, county of Essex, and State of New Jersey, have invented certain new and useful Improvements in Spring-Locks for Adjustable Casings of Roller-Bearings, fully described and represented in the following specification and the accompanying drawings, forming a part of the same.

This invention relates to a spring locking device for the two sections of a casing such as is used in a roller bearing for adjusting the contact of rolls with a conical hub.

In the present invention one section of the casing is made to fit inside the other, so that a continuous series of closely adjacent ratchet-teeth or recesses having double sloping faces can be formed upon the periphery of the inner section, and a locking tooth with a sloping face can be projected elastically through the shell of the outer section to engage such recesses. The periphery of the outer section is usually made of plain cylindrical form so as to fit within a cylindrical socket in any structure where such a roller bearing is required, and the spring which is located upon the periphery of the casing to carry the locking tooth must be sunk into a depressed socket upon such periphery so as not to project beyond its surface.

It is old to employ a locking tooth in connection with parallel-sided notches which, when engaged with such a tooth, absolutely prevent rotation of the sections upon one another; but the object of the present invention is to permit the turning of one of the sections upon the other in one direction or, if required, in either direction without manipulating the spring-tooth by hand; and ratchet teeth are employed when such free movement is required in one direction and resistance in the opposite direction, or recesses and a spring-tooth are employed which have faces sloped in both directions, to permit a rotation of one of the sections in relation to the other in either direction.

In my construction, the mere rotation of the section moves the sloping surfaces upon one another so as to automatically force the tooth elastically from the recess and hold it there during the rotation of the section until it drops into the next recess.

The recess may have a sloping face upon one side and an abrupt shoulder upon the opposite side, and the tooth correspondingly shaped, so that rotation of the sections in relation to one another in one direction will operate to lift the tooth from the recess, but rotation in the other direction is resisted by the opposition of the shoulders. Such construction permits one section of the casing to be screwed into the other without resistance from the tooth, until the two parts of the casing are suitably adjusted, when the fitting of the tooth into one of the recesses will prevent the backward turning of the casing, or the derangement of the adjustment, as the shoulders of the tooth and casing prevent any reverse movement.

The recesses may be made concave, which forms a sloping surface at both of their edges, and the tooth of convex form fitted to both of the sloping surfaces, which will permit movement of the casing sections in either direction, but serves to prevent the sections from accidental displacement upon one another by the spring pressure of the tooth into the recess.

Two modifications of the invention are shown in the annexed drawing, in which—

Figure 1 is an end view of the casing of a bearing provided with the improvement, a part of the inner and outer sections being broken away to the center of the socket in which the spring is seated; Fig. 2 is a longitudinal section of the complete bearing, where hatched, at the center line of the casing; Fig. 3 is an edge view of the casing showing the spring and its recess in the periphery of the outer section. In Fig. 1, the recesses are shown as holes through a circular flange; but Figs. 4 to 7 inclusive show modifications of the recesses and spring-tooth drawn upon twice the scale of the preceding figures. Fig. 4 shows part of the periphery of the inner section with the recesses sloped upon one side; Fig. 5 is a section of the shell and inner section with the spring having a sloping tooth adapted to fit such a recess; Fig. 6 shows part of the periphery of the inner section with concave recesses; and Fig. 7 is a section of the shell and inner section with part of the spring and a tooth having a convex end to fit such concave recesses.

The hub $a$ of the bearing is shown with double conical seats $b$ united at their bases and sustaining two sets of rolls $c$ and $c'$ which are guided in their movement, in practice by a cage.

The casing is formed of two annular sections, the outer section $d$ having a tapering seat to embrace the rolls $c$, and having a shell $e$ extended from the same and provided with the internal screw-thread $e'$. The inner section $d'$, having the seat to embrace the rolls $c'$, is provided with an external thread to screw within the shell, and a flange $b'$ which is provided upon its middle line with an annular series of recesses in the form of round holes $f$, and the shell $e$ is provided with a spring-tooth $g$ to engage such recesses.

In Figs. 1 and 3, a socket $h$ is extended circumferentially in the periphery of the shell, and a leaf spring $i$ has one end secured by a rivet $j$ in one end of the socket. A perforation $j'$ is formed through the shell near the opposite end of the recess, and the spring is provided with a stud $g'$ which extends through the perforation to carry the tooth $g$. The tooth is made cylindrical to enter any of the holes $f$, but sloped upon one side $v$ so that when the sections are turned in one direction in relation to one another, the edge of the hole $f$ presses upon the sloping face of the tooth and is thus adapted to force the tooth outward automatically. Such operation of the tooth permits the section $d'$ to be turned inside the shell $e$ in the direction of the arrow $d^2$, when screwing said section into the shell and thus enables the parts to be turned in relation to one another until the casing is properly adjusted upon the rolls, when the engagement of the tooth with one of the recesses secures the section $d'$ positively from turning backwardly, and thus prevents any accidental derangement of the adjustment. The sections are thus automatically locked in their adjusted position without any attention whatever on the part of the operator, except to arrange the parts in the required adjustment, the locking being effected independent of any attention or care upon his part.

In Fig. 1, the spring is shown extended slightly beyond the stud to form a lip $k$, and the socket is made of sufficient length to leave a clearance space $l$ beyond the end of such lip, so that a thin tool can be inserted beneath the lip when required, to withdraw the tooth from the recesses for unscrewing the section, and such a thin tool can then be pushed across the socket beneath the lip $k$ to rest upon the shoulders at both sides of the socket, and thus hold the tooth retracted from the recess without any attention on the part of the operator, while the inner section is unscrewed. The removal of the tool then permits the spring to press the tooth into engagement with any of the recesses which may be turned beneath the same. A single turning of the section $d'$ only advances the same within the shell by the space between two of the screw-threads $e'$, and the locking recesses are of sufficient number to permit a very minute adjustment of the casing-seats.

Fig. 4 shows the periphery of the inner section $b'$, which carries the recesses, the said recesses being shown with one side $u$ sloping and the opposite side $u'$ with an abrupt shoulder, and the tooth is correspondingly formed with a sloping end $v$ and abrupt shoulder.

The bore of the shell $e$ is made, adjacent to the perforation $j$, even with the tops of the screwthreads in the shell, and the exterior of the flange $b'$ upon the inner section is formed with a cylindrical seat to fit such portion of the shell, and the stud $g'$ may thus be supported by the walls of the perforation $j'$ close to the seat which contains the recesses.

In Fig. 5, the tooth is shown pushed out of a recess by the turning of the flange $b'$ within the shell $e$ toward the shoulder $u'$ the spring $i$ yielding during such movement of the tooth; and it is obvious that motion in the opposite direction can be prevented by the contact of the shoulder $u'$.

In Figs. 6 and 7, concave recesses $x$ are shown, the edges of which slope equally toward the periphery of the flange $b'$, and the tooth is shown with a convex face $x'$ adapted to engage such recesses, but capable of being pushed automatically outward when the shell and flange are rotated in either direction. Such a tooth when engaged with any of the recesses resists the displacement of the parts by the normal pressure of the spring $i$, and operates automatically to retain the adjusted section in any position to which it may be turned, as any material backward movement of the adjusted section would bring the tooth into the next one of the recesses and thus hold the parts in their adjusted position.

Spanner-bolts $t$ are shown upon the section $d'$ in Fig. 2, by which a suitable wrench or spanner may be applied to turn one section of the casing upon the other when adjusting the same. The construction shown in Figs. 1 and 5 permits the sections to be turned in one direction without manual assistance, but the use of a tool to lift the spring-tooth to release the sections when rotated, while the convex tooth of Fig. 7 is sloped upon its end in both directions, and is thus adapted to yield automatically when the sections are turned in either direction.

I am aware that it is common to employ a spring pawl and ratchet in connection with parts rotatable upon one another, to lock such parts in position when adjusted; but my construction differs from others in its special adaptation to a cylindrical casing intended to fit in a cylindrical socket, and from which no projection upon the exterior is admissible. The present construction, therefore, embodies a circumferential socket upon the periphery of the casing with a hole through the shell at one end of such socket, and a leaf-spring secured in the opposite end of the socket and provided with a tooth to engage any one of the recesses upon the periphery of the inner rotatable section.

Having thus set forth the nature of the invention what is claimed herein is:

1. A roller bearing having a sectional casing, the outer section $d$ having a cylindrical exterior with tapering roll-seat inside one end and having the shell $e$ extended from the other end and threaded internally, the inner section $d'$ fitted adjustably to such screw-thread, the hub $a$ having the double conical seats $b$ with sets of rolls $c$ and $c'$ between the same and the seats of the casing, the inner section $d'$ having the flange $b'$ provided upon its periphery with an annular series of recesses, the outer section $d$ having the circumferential socket $h$ upon its periphery with the perforation $j'$ through the shell $e$ near one end of said socket, the leaf-spring $i$ riveted in the opposite end of the recess and having a tooth extended through the perforation $j'$ and adapted to engage any of the recesses in the flange $b'$, the tooth having a sloping face and the recesses operating to push the tooth automatically outward when one section is turned upon the other, substantially as shown and described.

2. A roller bearing having a sectional casing, the outer section $d$ having a cylindrical exterior with tapering roll-seat inside one end and having the shell $e$ extended from the other end and threaded internally, the inner section $d'$ fitted adjustably to such screw-thread, the hub $a$ having the double conical seats $b$ with sets of rolls $c$ and $c'$ between the same and the seats of the casing, the inner section $d'$ having the flange $b'$ provided upon its periphery with an annular series of adjacent concave recesses having doubly sloped faces, the outer section $d$ having the circumferential socket $h$ upon its periphery with the perforation $j'$ through the shell $e$ near one end of said socket, the leaf-spring $i$ riveted in the opposite end of the recess and having a tooth extended through the perforation $j'$ and adapted to engage any of the recesses in the flange $b'$, the tooth being provided with a convex end fitted to the concave recesses, and the recesses operating to push the tooth automatically outward when one section is turned upon the other in either direction, substantially as shown and described.

In testimony whereof I have hereunto set my hand in the presence of two subscribing witnesses.

CHARLES S. LOCKWOOD.

Witnesses:
BENJAMIN FLASTER,
CHARLES S. DUFFY.